United States Patent [19]
Burge

[11] 3,727,660
[45] Apr. 17, 1973

[54] BOLT RETAINER AND COMPRESSOR EMPLOYING SAME

[75] Inventor: Joseph C. Burge, Cincinnati, Ohio

[73] Assignee: General Electric Company, Lynn, Mass.

[22] Filed: Feb. 16, 1971

[21] Appl. No.: 115,273

[52] U.S. Cl. ................151/69, 151/41.71, 415/172
[51] Int. Cl. ..............................................F16b 41/00
[58] Field of Search..........................151/69, 41.71; 287/189.36 F

[56] References Cited

UNITED STATES PATENTS

| | | |
|---|---|---|
| 2,800,247 | 7/1957 | Appleton..............................151/69 |
| 2,645,317 | 7/1953 | Staaf.....................287/189.36 F |
| 3,170,473 | 2/1965 | Downs et al............................151/69 |
| 2,907,419 | 10/1959 | Klank.....................................151/69 |
| 3,186,465 | 6/1965 | Hayunga..........................151/41.71 |

*Primary Examiner*—Edward C. Allen
*Attorney*—Derek P. Lawrence, Frank L. Neuhauser, Oscar B. Waddell, Joseph B. Forman and Edward S. Roman

[57] ABSTRACT

The disclosure shows a sealing member secured to the inner end of a compressor stator vane row by bolts and nuts. One form of bolt retainer prevents a loosened bolt from entering the flow field. The retainer is of hollow, box-like cross section with keyhole slots in its inner wall for assembly and access holes in its outer wall for insertion of an allen wrench to torque the bolts. Another form of bolt retainer provides access to the outer portion of the bolt heads so that they may be tightened and loosened. A third form of retainer may be assembled laterally and comprises a plate and retainer lugs for the bolts.

6 Claims, 6 Drawing Figures

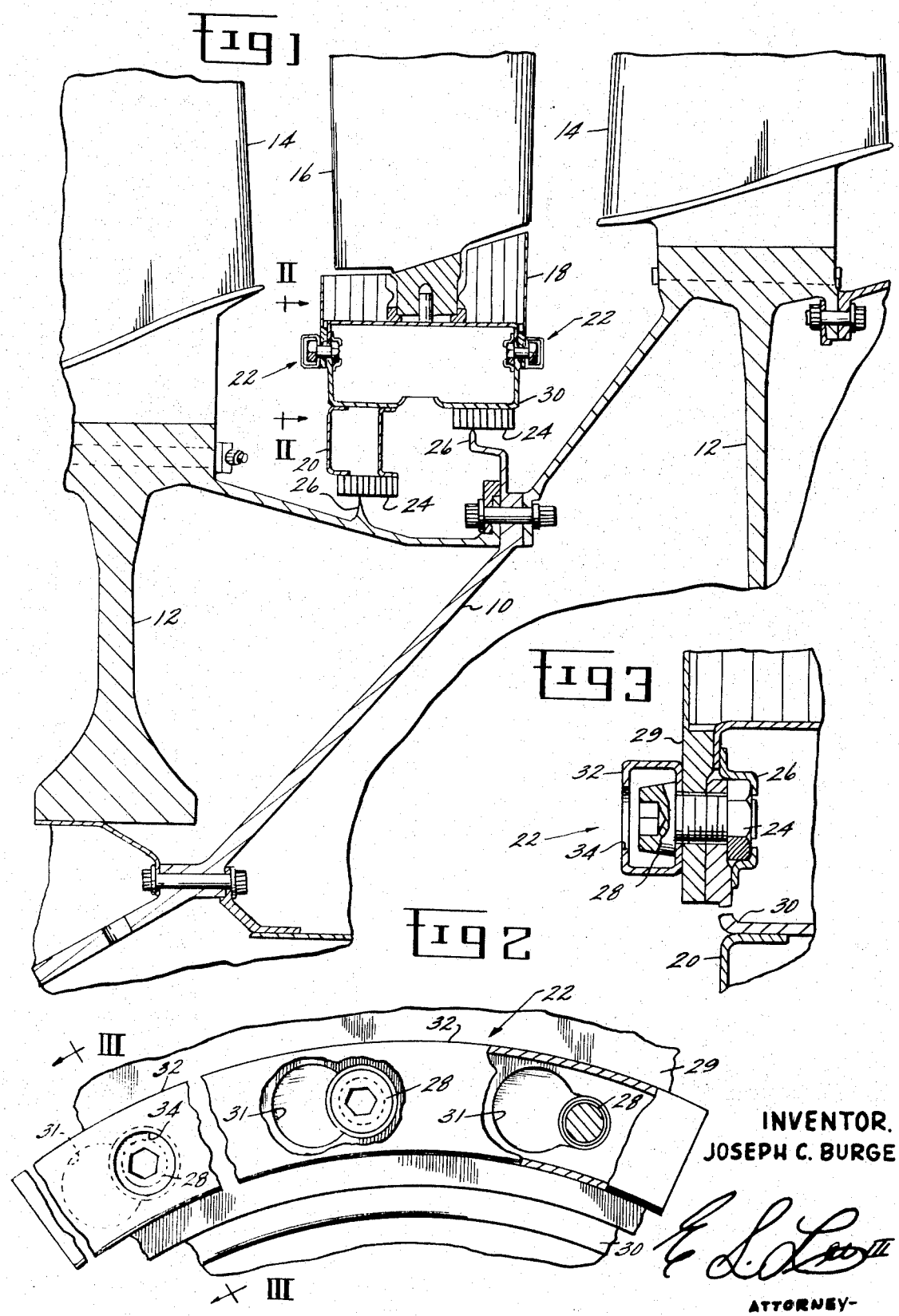

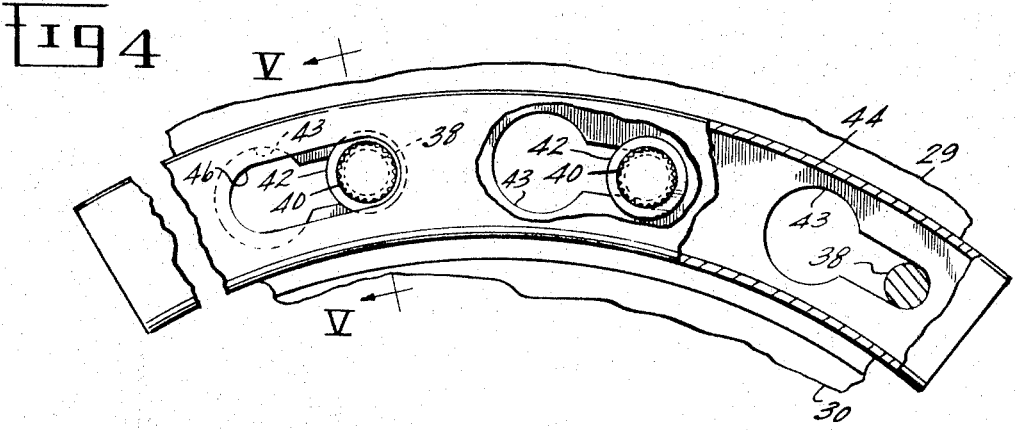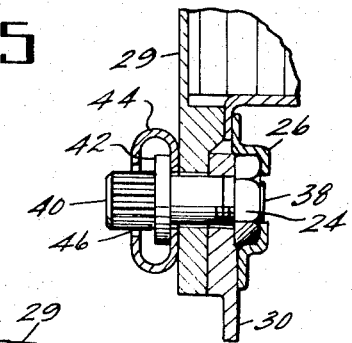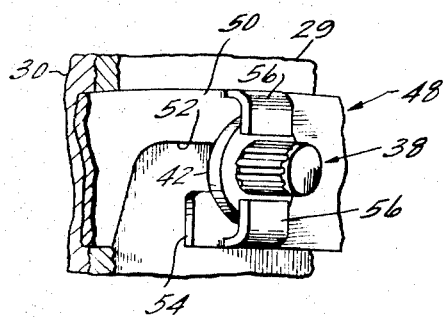

BOLT RETAINER AND COMPRESSOR EMPLOYING SAME

The invention described and claimed in the United States patent application herein resulted from work done under United States Government contract FA-SS-67-7. The United States Government has an irrevocable, non-exclusive license under said application to practice and have practiced the invention claimed herein, including the unlimited right to sublicense others to practice and have practiced the claimed invention for any purpose whatsoever.

The present invention relates to improvements in fasteners having bolt retainers and, in more limited aspects, to a compressor employing same.

Axial flow compressors comprise a rotor having one or more circumferential rows of cambered airfoil blades. Downstream of each blade row there is a circumferential row of stator vanes mounted on the outer casing of the compressor. It is desirable to removably mount circumferential sealing members on the inner ends of the vanes. Such sealing members cooperate with teeth on the rotor to minimize pressure losses.

When bolts are employed to secure these sealing members, self-locking nuts, such as those having a plastic insert, are used to prevent loosening of the bolts. Even so, the extreme vibrations encountered in operation cause the bolts to loosen and, in rare cases, to disengage and enter the flow field of the compressor. Such an occurrence can cause extensive damage to the compressor blading as well as to the blading of turbines commonly in series flow relationship with compressors. Even though this happens rarely, the extensive damage which can result makes it necessary to provide more positive retention of these bolts.

The use of rivets or "tack" welding of the bolt heads would provide a positive retention of the fasteners. This solution is undesirable since it makes removal of the sealing member for maintenance purposes difficult and time consuming.

Accordingly, one object of the invention is to provide an improved fastening means for the sealing members of axial flow compressor stator vanes which greatly minimizes, if not eliminates, the possibility of an attaching bolt entering the compressor flow field while at the same time provides for easy assembly and disassembly.

Another and broader object of the invention is to provide an improved bolt retainer which can be used in combination with standard bolts.

These ends are attained by a fastener which includes a plurality of spaced bolts threaded into internally threaded members. A bolt retainer of hollow, box-like cross section has keyhole slots spaced in the same fashion as the bolts. The large ends of the keyhole slots telescope over the bolt heads permitting the retainer to be indexed to bring the bolt bodies into the small ends of the keyhole slots. Openings in the outer wall of the retainer are aligned with the small ends of the keyhole slots. These outer openings are smaller than the heads of the bolts and large enough for insertion of a torquing tool to engage torquing surfaces on the bolt heads. The bolts may thus be tightened to clamp the inner wall of the retainer.

Where the bolts have collars at the bases of their heads, the exterior height of the hollow, box-like retainer is less than the height of the bolt head and its interior height is somewhat greater than the height of the collar. The outer portion of the bolt heads projects through slots in the outer wall of the retainer overlying the keyhole slots. This provides access to torquing surfaces on the periphery of the bolt head as well as the retention function.

The box-like cross section of the retainer provides rigidity against induced vibrations with a minimum of weight. Where this feature is not required, the retainer may take the form of an elongated plate having holes which receive the bodies of the bolts and lugs that overlie portions of the bolt heads.

In attaching sealing members to stator vanes, the bolts are disposed in angularly spaced relation and the bolt retainers are arcuate segments.

The above and other related objects and features of the invention will be apparent from a reading of the following description of the disclosure found in the accompanying drawings and the novelty thereof pointed out in the appended claims.

FIG. 1 is a fragmentary view, in longitudinal section, of an axial flow compressor;

FIG. 2 is an enlarged view of a novel fastener employed in the compressor of FIG. 1;

FIG. 3 is a section taken on line III—III in FIG. 2;

FIG. 4 is a view, similar to FIG. 2, illustrating another embodiment of the invention;

FIG. 5 is a section taken on line V—V in FIG. 4; and

FIG. 6 is a fragmentary, perspective view of a further embodiment of the invention.

FIG. 1 illustrates the forward portions of an axial flow compressor which comprises an appropriately journaled rotor 10. The rotor may comprise a series of discs 12 having cambered airfoil blades 14 mounted around their peripheries. Downstream of each blade row is a row of cambered airfoil stator vanes 16 mounted on the compressor casing (not shown). The inner ends of the stator vanes (in a given row) are mounted on a shroud 18. A circumferential sealing member 20 is connected to the shroud 18 by fastening means 22. In many cases the compressor casing is formed by two semicylindrical shells joined together at longitudinal split lines. In such a case, the sealing member could be formed by two 180° segments. The sealing member has abradable surfaces 24 which cooperate with sealing teeth 26 on the rotor 24 to minimize flow losses across the stator stage. In order that the sealing surfaces may be repaired or replaced, the sealing members are removably secured to the shrouds 18 by the fastening means 22 which will now be described in detail with reference to FIGS. 2 and 3.

Nuts 24 are captured on the inner surface of the sealing member structure by a retainer 26 secured thereto. Bolts 28 pass through aligned holes in overlapping radial flanges 29 and 30 to the shroud 18 and sealing member, respectively. The bolts 28 also pass through keyhole slots 31 in the inner wall of a bolt retainer 32. The bolt retainer has an arcuate length sufficient for at least two or more keyhole slots 31 so that it will be clamped by two or more bolts. The bolt retainer is of hollow, box-like configuration sufficient to accommodate the heads of the bolts 28.

In assembly the bolts 28 are partially threaded into the nuts 24. The bolt retainers are then telescoped over the heads of the bolts which readily pass through the larger portions of the keyhole slots 31. Each bolt retainer is then indexed to register the smaller portions of the keyhole slots with the body portions of the bolts as illustrated. Holes 34 in the outer wall of the bolt retainer are aligned with the smaller portions of the keyhole slots 31. When the bolt retainers are thus indexed access is provided for insertion of a wrench (not shown) through a hole 34 and into a noncircular socket 36 formed centrally in the outer surface of each bolt head. Each bolt may thus be turned to firmly clamp the flanges 29 and 30, and the inner wall of the bolt retainer 32 together.

The nuts 24 are preferably of the self-locking type, as for example the kind that have plastic plugs deformed by the bolt threads. Nonetheless, the severe vibrational environment of this fastener application might cause an individual bolt to loosen. Even should this occur, the chances of any fastener components coming loose and entering the flow path of the compressor, where damage could result, are remote in the extreme. Should a single bolt loosen, it could not escape from the retainer since the holes 34 are smaller than the heads of the bolts. The remaining bolts 28 secure the retainer 32 in place so that the loose bolt 28 is restrained from entering the compressor flow field. With this arrangement, all bolts of a given retainer must loosen before there is a possibility of a bolt coming loose. To even further minimize the possibility of a fastener element entering the flow field, the bolt retainers on each casing half jointly form an angle of about 180° with their adjacent ends being closely spaced as illustrated in FIG. 3. Thus, when the casing halves are joined, none of the bolt retainers can index to bring the large ends of the keyhole slots 31 into register with the bolt heads except in the unlikely event that all bolts would loosen and all bolt retainers would index.

FIGS. 4 and 5 illustrate another embodiment of the invention particularly adapted for a type of bolt commonly employed in gas turbine engines. These bolts, indicated at 38, have fluted heads 40 with an integral, enlarged collar 42 at the bases of the heads. The bolts 38 again pass through holes in the flanges 29 and 30 and are threaded into captured nuts 24 as before. The bolts pass through keyhole slots 43 in the inner wall of a retainer 44 with the collars 42 clamped against this inner wall.

Assembly is essentially the same as previously described. The bolts 38 are partially threaded into the nuts 24. The bolt retainer is telescoped over the heads of the bolts, the collars 42 passing through the large ends of the keyhole slots 43. The retainer 44 is also of hollow, box-like cross section but has a height less than the bolt head and an interior height slightly greater than that of the bolt head collar 42. The fluted end portions 40 of the bolt heads extend through slots 46 in the outer wall of the retainer permitting the retainer to be indexed to the locking position illustrated. The flutes or torquing surfaces are thus accessible to a wrench so that they may be tightened during assembly and loosened during disassembly.

The box-like cross section of the described retainers is highly important in fasteners employed on a compressor rotor. This feature gives rigidity to the retainer which prevents vibrations from being induced therein which would cause cracking of the retainer. A cracked retainer could permit a bolt to loosen and both the bolt and the cracked portion of the retainer would then become a hazard should they enter the flow field of the compressor.

This type of vibration, however, does not exist in all instances, in which case the embodiment of FIG. 6 could be employed. In FIG. 6 bolts 38 (one is shown) again secure the flanges 29 and 30, being threaded into captured nuts as before. A retainer 48 is provided for a plurality of bolts 38. This retainer comprises an elongated plate portion 50 corresponding to the inner walls of the previously described retainers. Slots 52 are formed in this plate with inner portions thereof receiving the bodies of the bolts. The slots 52 have enlarged openings 54 at the inner side of the plate portion to permit an angular sector for several bolts to be assembled laterally and then indexed to the illustrated position. In this position lugs 56, integral with the plate portion 50, overlie the bolt head collar 42 and function in the same fashion as the slotted portions of the outer walls of the previously described retainers.

While certain aspects of the invention are directed to the described application of attaching sealing members to the inner shrouds of axial flow compressors, other and broader aspects of the invention are directed to improved fastening means for a wide variety of applications. The spirit and scope of the present inventive concepts are therefore to be derived solely from the following claims.

Having thus described the invention, what is claimed as novel and desired to be secured by Letters Patent of the United States is:

1. A fastener comprising a plurality of internally threaded elements,
    a plurality of headed bolts respectively threaded into said elements, each bolt having torquing surfaces on its head, and a collar at the base of the bolt head,
    a box-like cross-section bolt retainer including an elongated plate-like portion having a plurality of elongated slots spaced apart along the longitudinal length thereof, having large ends which register respectively with and pass over the heads of said bolts and small ends which respectively receive the bodies of the bolts as the bolt heads clamp the plate-like element, and further including an integral elongated retainer portion overlying portions of the bolt head and providing access to the torquing surfaces thereof wherein the external height of the box-like cross-section is less than the height of the bolt heads and the interior height of the box-like cross-section approximates the height of the bolt head collar, and
    slots are provided in the outer retainer portion of the bolt retainer in overlying relation to said elongated slots, the width of said outer slots being sufficiently large for the bolt heads to project therethrough but small enough to prevent the collars from passing therethrough.

2. The fastener of claim 1 for clamping two overlapping arcuate flanges wherein:
    the bolt retainer is arcuate along the longitudinal length thereof for abutting engagement against an outside surface of said overlapping arcuate flanges, and the internally threaded members take the form of captured nuts for engagement against the opposing outside surface of said overlapping arcuate flanges with the bolts extending through said flanges.

3. The fastener of claim 2 wherein said bolt retainer is formed as an annulus with inadvertent circumferential indexing occurring only when all bolts become loosened.

4. A fastener comprising a plurality of internally threaded elements, a plurality of headed bolts respectively threaded into said elements, each bolt having torquing surfaces on its head provided by a non-circular socket in the outer end thereof, a box-like cross-section bolt retainer including an elongated plate-like portion having a plurality of keyhole slots spaced apart along the longitudinal length thereof, having large ends which register respectively with and pass over the heads of said bolts and small ends which respectively receive the bodies of the bolts as the bolt heads clamp the plate-like element, and further including an integral elongated retainer portion overlying portions of the bolt head and providing access to the torquing surfaces thereof wherein the interior height of the hollow, box-like cross-section is sufficient to receive the entire bolt head and openings are provided in the outer retainer portion of the bolt retainer in registration with the smaller ends of the keyhole slots said openings being sufficiently large enough for insertion of a torquing tool into said sockets and small enough to prevent the bolt head from passing therethrough.

5. The fastener of claim 4 for clamping two overlapping arcuate flanges wherein:

the bolt retainer is arcuate along the longitudinal length thereof for abutting engagement against an outside surface of said overlapping arcuate flanges, and the internally threaded members take the form of captured nuts for engagement against the opposing outside surface of said overlapping arcuate flanges with the bolts extending through said flanges.

6. The fastener of claim 5 wherein said bolt retainer is formed as an annulus with inadvertent circumferential indexing occurring only when all bolts become loosened.

* * * * *